US012784085B2

(12) United States Patent
Swanson et al.

(10) Patent No.: US 12,784,085 B2
(45) Date of Patent: Nov. 3, 2026

(54) MEDIA-ENHANCED GIFTING SYSTEM

(71) Applicant: Hallmark Cards, Incorporated, Kansas City, MO (US)

(72) Inventors: Kevin Weldon Swanson, Kansas City, MO (US); Gary Thomas Pratt, Lawrence, KS (US)

(73) Assignee: Hallmark Cards, Incorporated, Kansas City, MO (US)

(*) Notice: Subject to any disclaimer, the term of this patent is extended or adjusted under 35 U.S.C. 154(b) by 0 days.

(21) Appl. No.: 18/806,775

(22) Filed: Aug. 16, 2024

(65) Prior Publication Data

US 2025/0061502 A1 Feb. 20, 2025

Related U.S. Application Data

(60) Provisional application No. 63/520,546, filed on Aug. 18, 2023.

(51) Int. Cl.
*G06Q 30/00* (2023.01)
*G06Q 30/0601* (2023.01)
*G06K 7/14* (2006.01)

(52) U.S. Cl.
CPC ..... *G06Q 30/0621* (2013.01); *G06Q 30/0641* (2013.01); *G06K 7/1417* (2013.01)

(58) Field of Classification Search
None
See application file for complete search history.

(56) References Cited

U.S. PATENT DOCUMENTS

2015/0317711 A1* 11/2015 Glass .................... G06Q 50/04 705/26.5
2018/0247359 A1* 8/2018 Kressler ............... G06Q 20/348
2020/0286143 A1* 9/2020 Wood ................. G06Q 30/0621
2022/0122089 A1* 4/2022 Bonilla Kuhlmann ...................... G06K 7/1417

OTHER PUBLICATIONS

Personalized Cash/Gift Cards; Sep. 13, 2007.*

* cited by examiner

*Primary Examiner* — Mila Airapetian
(74) *Attorney, Agent, or Firm* — Practus, LLP; Jesse J. Camacho

(57) ABSTRACT

An improved gifting system is provided, one embodiment of which includes a container to receive a gift, a thematic character depicted on at least a portion of the container, and a unique identifier coupled to or associated with the container. The unique identifier uniquely identifies the container and is useable to reference a digital record stored in a computing system, which includes a registration database, one or more processors coupled to the registration database for updating state information, and a presentation server coupled to the registration database and the one or more processors. The presentation server is adapted to receive user input from a remote device and upon request, present a custom presentation on the remote device that includes the user input presented in a context that includes predefined attributes associated with the thematic character.

14 Claims, 7 Drawing Sheets

MEDIA-ENHANCED GIFTING SYSTEM

CROSS-REFERENCE TO RELATED APPLICATIONS

This application claims the benefit of U.S. Provisional Application No. 63/520,546 (filed on Aug. 18, 2023 and entitled MEDIA-ENHANCED GIFTING SYSTEM), which is incorporated by reference herein for all purposes.

BACKGROUND

Part of some gift-giving experiences is secreting the gift. Gifts are often hidden in boxes or bags until revealed by the recipient. But things like the unwrapping or unboxing experience have historically been "one size fits all" or otherwise not technologically tied or personalized to the recipient. The art could be improved by providing a media-enhanced gifting system that pairs a digital counterpart presentation to a specific gift container.

The improved gifting system can be customized to the recipient and based on attributes of one or more characters that appear on a surface of the container. For example, someone might have a friend who shares a special bond with horses. In accordance with an embodiment of the improved system, the gift giver could select a gift bag with a picture of a horse, create a custom message, and tie it to a unique identifier. The recipient could then use the unique identifier to retrieve the message upon receiving the gift, and the message would be presented based on pre-defined attributes of a horse (such as tone, puns, etc.).

In the past, technological barriers have prevented implementing such a system. For example, all bags or wrapping paper are generic and not uniquely identified. And attributes of characters have not been pre-stored such that they can be invoked to present a personalized message consistent with those attributes. Embodiments of the present invention overcome these and other shortcomings to provide an improved gifting system and methods.

DETAILED DESCRIPTION

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing or electronic process that may be performed using any combination of hardware, firmware, and/or software. For instance, various functions may be carried out by a processor executing instructions stored in memory. Some methods may also be embodied as computer-usable instructions stored on Computer-storage media.

Aspects of the disclosed technology provide an improved, personalized, technology-enhanced gifting experience. For example, say a grandparent knows that a child enjoys the story of Santa Claus. An embodiment of the disclosed technology would provide the grandparent with an ability to select and customize a gift bag that includes a depiction of a thematic character, in this case, Santa Claus. Some aspects of the customization include customizing a message to be played to the recipient. And because the gift bag depicts a Santa Claus, the giver can further customize the message to be played back based on predefined attributes of Santa Claus, such as jovially speaking, starting with "Ho, Ho, Ho," and the like.

Presentation messages are not limited to textual. Although a user may type a textual message, a voice-to-text engine converts the typed lines into contextual audio based on the attributes of the thematic character, and more than audio can be provided. For example, a graphical depiction of a Santa Claus can be provided, whose lips and mannerisms animate while he reads the message to the recipient. Likewise, contextually relevant music—such as music consistent with Santa Claus's Winter Wonderland—can be played in the background.

Figure 1:
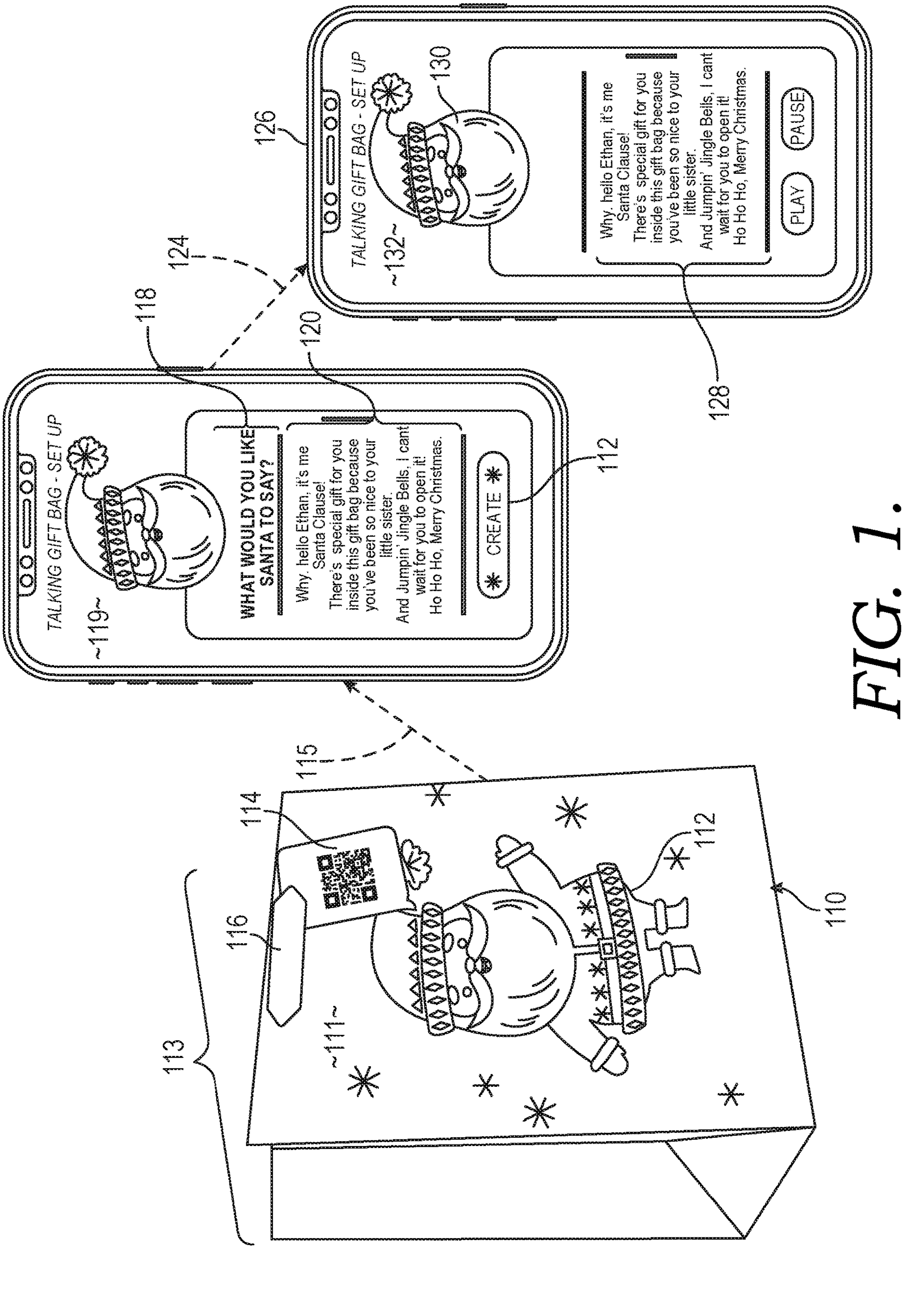
FIG. 1 depicts illustrative aspects of an improved gifting system in accordance with one embodiment of the disclosed technology.

This example will now be used as a framework to introduce aspects of embodiments of the disclosed technology with reference to FIG. 1. FIG. 1 includes a container 110. Although container 110 is depicted as a gift bag, it does not have to be a gift bag. Container 110 could be a box, a box with a lid, or any other container suitable for gifting a gift. In some embodiments, container 110 includes an outer shell 113 that defines an interior void, where the present would go. Outer shell 113 includes artwork, colors, and other items that create a general tangible aesthetic impression 111.

A thematic character 112 forms a portion of aesthetic impression 111. In the illustrative example shown, thematic character 112 is a representation of a Santa Claus. But thematic character 112 could take on a variety of forms. It could be a single item or multiple items, such as a cast of superheroes. Thematic character 112 can be a popular character well known in the culture or lesser known. Thematic character 112 could even be a representation of the giver or recipient for a still more personalized gifting experience. In that case, as will be explained in greater detail below, attributes of the giver or recipient can be provided to the system (or, in some embodiments, extracted by the system from available resources such as voice samples from videos, etc.) and later be used during playback.

A unique identifier 114 is coupled to container 110. Here, "coupled" encompasses a broad scope to include "part of"

because in some embodiments, unique identifier 114 forms a portion of background 111, which would be the case when, for example, it 114 is printed on container 110 itself. Unique identifier 114 could be coupled, in the more traditional sense, to container 110 via an attachment mechanism 116, which, although shown as a ribbon, could be an adhesive (unique identifier 114 could be a sticker), cable, string, or similar.

Unique identifier 114 uniquely identifies container 110. It is usable to distinguish a given container from all other containers that might be used. Unique identifier 114, could be a QR code, radiofrequency identification tag (RFID), near-field communication (NFC) chip/circuit, string of alphanumeric characters, and/or unique design. Unique identifier 114 allows an associated container 110 to be uniquely identified and ultimately associated with a corresponding digital presentation.

By way of example, gift bag 110 is associated with a digital presentation in one embodiment. Broken line 115 indicates that a relationship can be established between gift bag 110 (by virtue of unique identifier 114) and a presentation that is created 119 and a version 132 that is ultimately presented to a recipient incident to the recipient scanning unique identifier 114.

For example, in one embodiment, a gift giver would scan unique identifier 114 with his or her smartphone 117. Here, "scan" is used broadly to encompass, for example, opening one's camera app, directing focus to QR code 114, and tapping on the QR code, which would initiate a request to the system and trigger a presentation of a user interface 119 that has the aesthetics that mirrors those of physical container 110 as reflected by numeral 111. Presenting a user interface 119 on device 117 that is similar in form to that of container 110 provides the user with confirmation that the personalized presentation being developed is being developed as intended.

As mentioned, beginning the process of customizing a presentation is not limited to scanning a QR code. Rather a user could have entered a unique alphanumeric string, interacted with an NFC chip, or otherwise provided identifying indicia that identified container 110.

Incident to the system receiving the request, a user interface 119 is caused to be presented on a giver's device. User interface 119 includes a variety of controls (not all shown), which can be in the form of buttons, sliders, and other user interface elements that help facilitate the creation of a desired presentation that will be presented to the recipient. For example, a "create" button 122 is shown. A prompt 118 can prompt the user to enter text to be read or otherwise conveyed to the recipient. The illustrative prompt reads "What would you like Santa to say?"

This provides a way for the sender to enter desired text, such as via control 120, which can be a text box. Text is not the only form of data that can be included. Users can indicate audio segments, songs, pictures, links, or other forms of multimedia. The "create" button (or similar) 122 is useable to indicate that the user desires the presentation to be created. In some embodiments, this triggers a presentation to be created at that time and stored for later retrieval.

In other embodiments, data necessary to present a streaming version of the presentation in real time is saved. In this embodiment, less data needs to be saved. When a recipient desires to retrieve the presentation (such as by also scanning unique identifier 114), the system references the stored data and presents a presentation in real time based on the stored data.

Regardless of whether a presentation is stored or finally generated in real time, a rendering is provided to the recipient via remote device 126, as indicated by broken line 124. The rendering has aesthetics 132 that again track the appearance, look, and feel of the original gift bag 110 in one embodiment. For example, it presents a Santa representation 130 as well. In one embodiment, the Santa representation 130 is animated. Its lips move as it plays text 128. Its voice pattern and inflection points mimic those that one would expect Santa Claus to have. In one embodiment, these character attributes are pre-defined and stored such that a gift giver can provide the same text message to multiple recipients, wherein each recipient would receive a different message based on the context 111 of the respective containers and the attributes of the respective characters that appear on the corresponding gift bags (or other containers).

Figure 2:
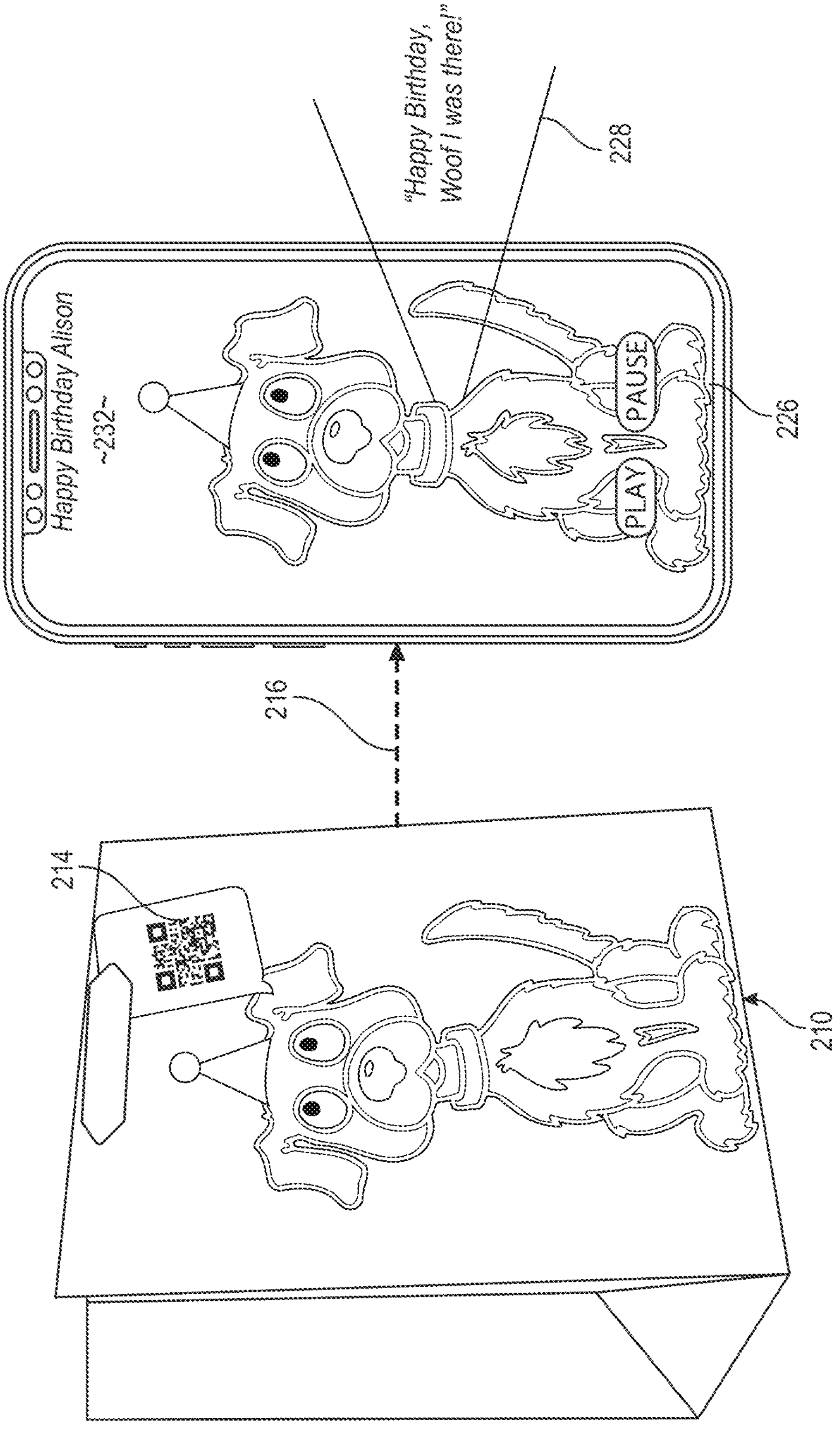
FIG. 2 depicts illustrative aspects of an improved gifting system in accordance with one embodiment of the disclosed technology.

A wide variety of thematic characters could be used. For example, FIG. 2 provides an example of a thematic character being a dog. A dog appears on bag 210 as well as on recipient device 226. In this example, broken line 216 represents a correlation between gift bag 210 and the end presentation 232 that is presented to a recipient. Some intermediary steps and devices, such as the sender using a device to create the presentation, are omitted as compared to FIG. 1. Unique identifier 214 can take on a variety of states, as could unique identifier 114. The various states could be indicated by statuses such as inactive, active, in progress, process complete, downloaded, watched, etc. In the embodiment of FIG. 2, the presentation delivered to the recipient would be done so based on character attributes of a dog, which are predetermined and stored, and gleaned in real time. As with the other figures, the animated character (such as the puppy of FIG. 2) moves its lips and gestures consistent with the predetermined attributes, as indicated by numeral 228.

Figure 3:
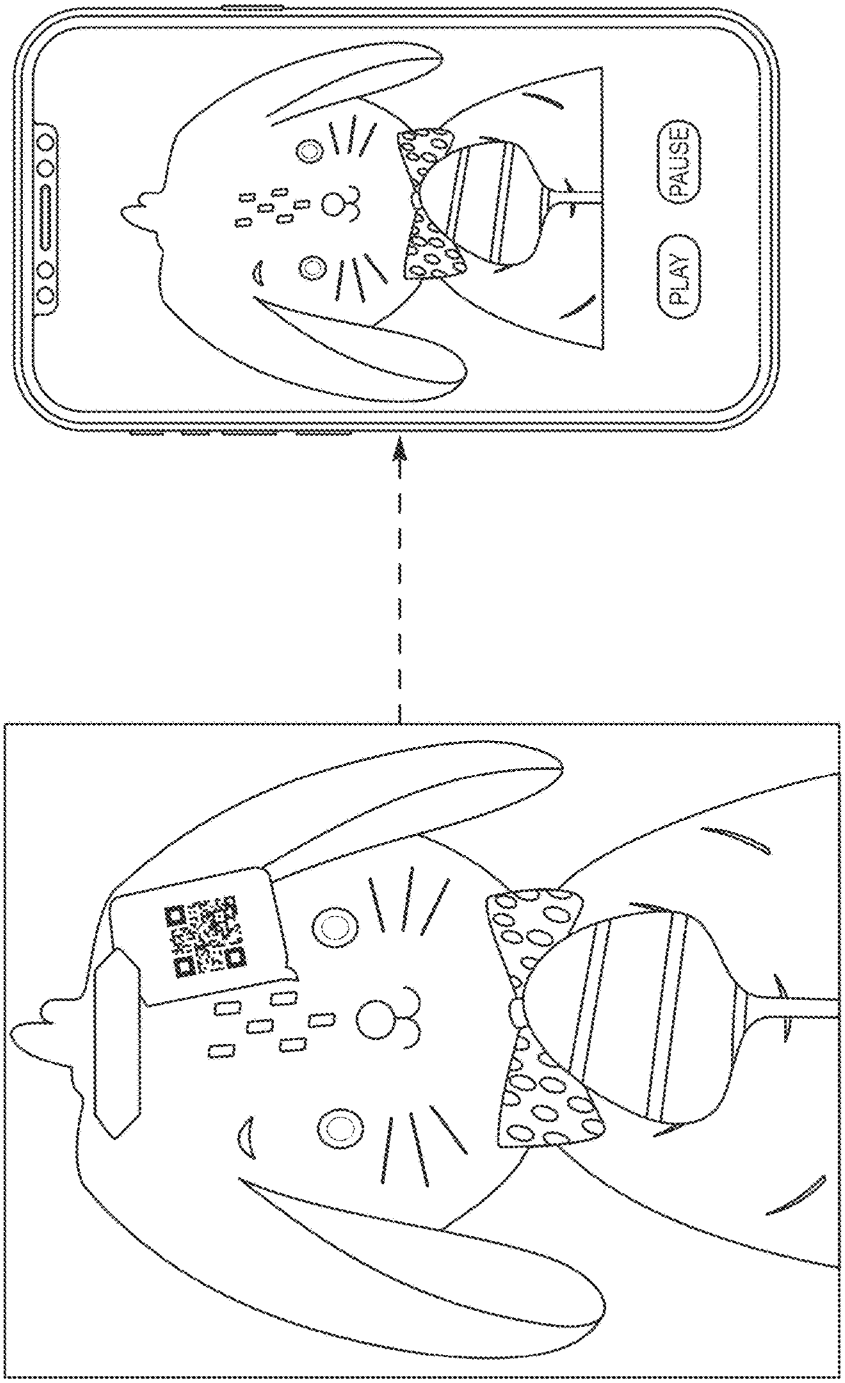
FIG. 3 depicts illustrative aspects of an improved gifting system in accordance with one embodiment of the disclosed technology.
Figure 4:
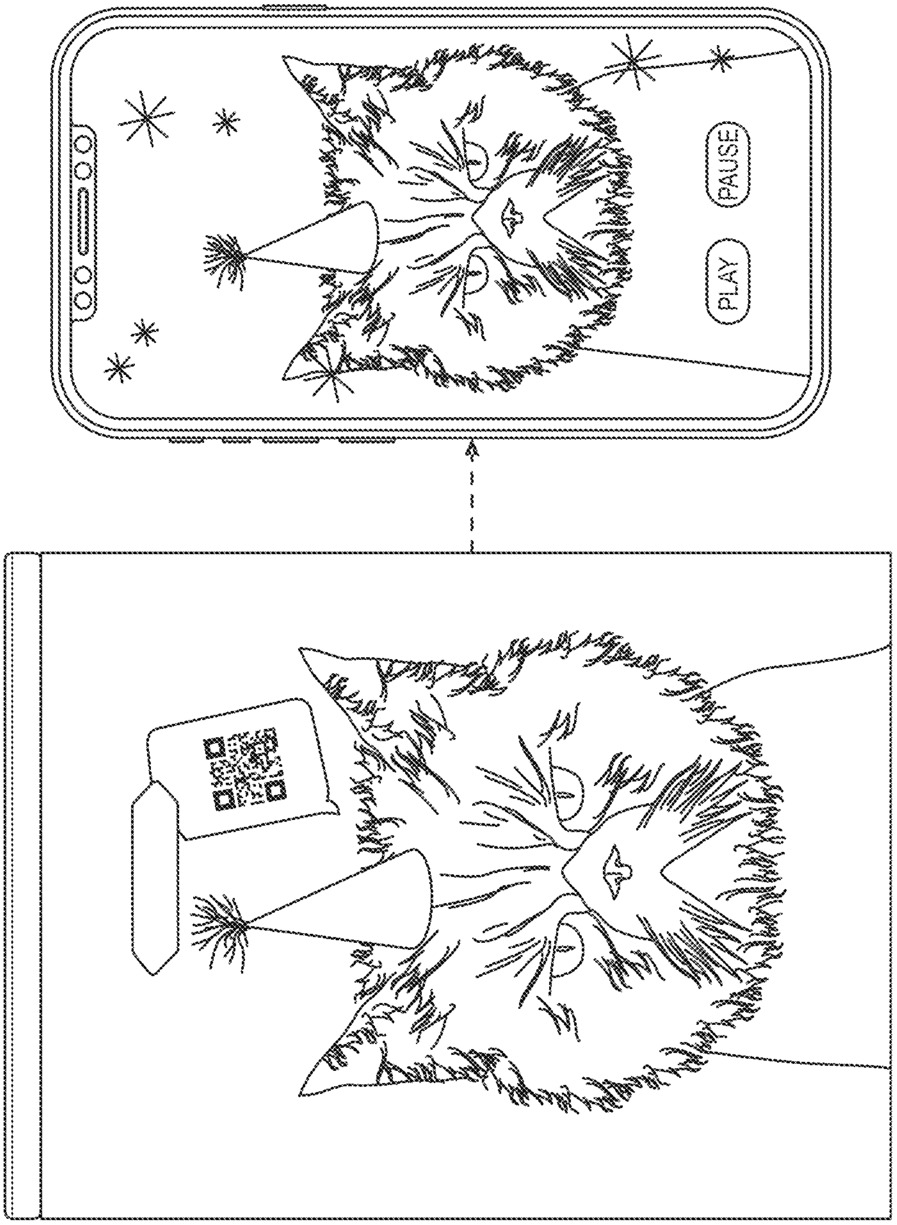
FIG. 4 depicts illustrative aspects of an improved gifting system in accordance with one embodiment of the disclosed technology.

FIG. 3 presents a similar embodiment, except that the thematic character is a bunny rabbit. Similarly, FIG. 4, presents a similar embodiment, where the thematic character is a cat.

Illustrative computing devices.

Figure 5:
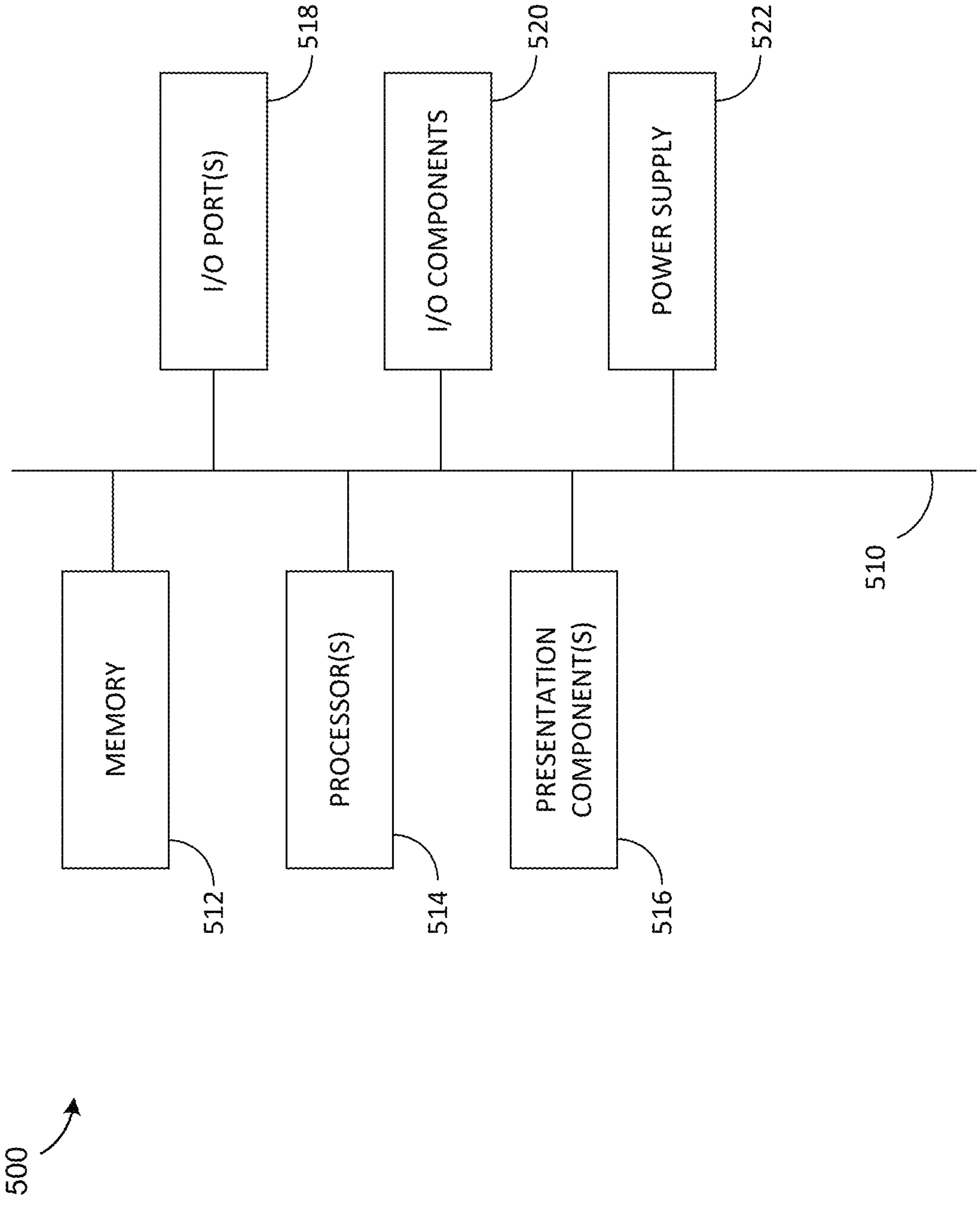
FIG. 5 is a block diagram that depicts aspects of illustrative computing-device arrangements suitable for use in implementing aspects of the disclosed technology.

Various computing devices are used in some embodiments to implement desired functionality. FIG. 5 provides a block diagram of structure of such devices. With reference to FIG. 5, a computing device 500 includes a bus 510 that directly or indirectly couples the following devices: memory 512, one or more processors 514, one or more presentation components 516, one or more input/output (I/O) ports 518, one or more I/O components 520, and an illustrative power supply 522. Bus 510 represents what may be one or more busses (such as an address bus, data bus, or combination thereof). Although the various blocks of FIG. 5 are shown with lines for the sake of clarity, these blocks represent logical, not necessarily actual, components. For example, one may consider a presentation component such as a display device to be an I/O component. Also, processors have memory. The inventors hereof recognize that such is the nature of the art and reiterate that the diagram of FIG. 5 is merely illustrative of an exemplary computing device that can be used in connection with one or more embodiments of the disclosed technology. (For example, presentation component 516 may be used as part of a user interface) Distinction is not made between such categories as "workstation," "server," "laptop," "handheld device," etc., as all are contemplated within the scope of FIG. 5 and with reference to "computing device," "server," or similar.

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise Computer-storage media and communication media. Computer-storage media includes both volatile and nonvolatile, removable and non-removable media implemented in any method or technology for storage of information such as computer-readable instructions, data structures, program modules or other data.

Computer-storage media includes, but is not limited to, RAM, ROM, EEPROM, flash memory or other memory technology, CD-ROM, digital versatile disks (DVDs) or other optical disk storage, magnetic cassettes, magnetic tape, solid-state storage, magnetic disk storage or other magnetic storage devices, or any other medium that can be used to store the desired information and which can be accessed by computing device 500. Computer-storage media does not comprise signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 512 includes computer-storage media in the form of volatile and/or nonvolatile memory. The memory may be removable, non-removable, or a combination thereof. Exemplary hardware devices include solid-state memory, hard drives, optical-disc drives, etc. The computer-storage media can be non-transitory and/or embody non-transitory computer-executable instructions. Computing device 500 includes one or more processors 514 that read data from various entities such as memory 512 or I/O components 520. Presentation component(s) 516 presents data indications to a user or other device. Exemplary presentation components include a display device, including a projector, speaker, printing component, vibrating/tactile-feedback component, user interface, and/or the like.

The I/O ports 518 allow computing device 500 to be logically coupled to other devices, including I/O components 520, some of which may be built in. Illustrative components include a microphone, joystick, game pad, satellite dish, scanner, printer, wireless communication device, etc. The I/O components 520 may provide a natural user interface (NUI) that processes air gestures, voice, or other physiological inputs generated by a user, for example, a user touching, motioning towards, selecting, or pointing to content projected onto a surface in a presentation environment. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as stereoscopic camera systems, acoustic, infrared camera systems, RGB camera systems, RF-interference detection, or the like, and/or a combination of these for gesture detection and recognition. Additionally, the computing device 500 may be equipped with (or operate in conjunction with) accelerometers or gyroscopes that enable detection of motion. The output of the accelerometers or gyroscopes may be provided to the display of the computing device 500 to render immersive augmented reality or virtual reality.

Illustrative Operating Environment.

Figure 6:
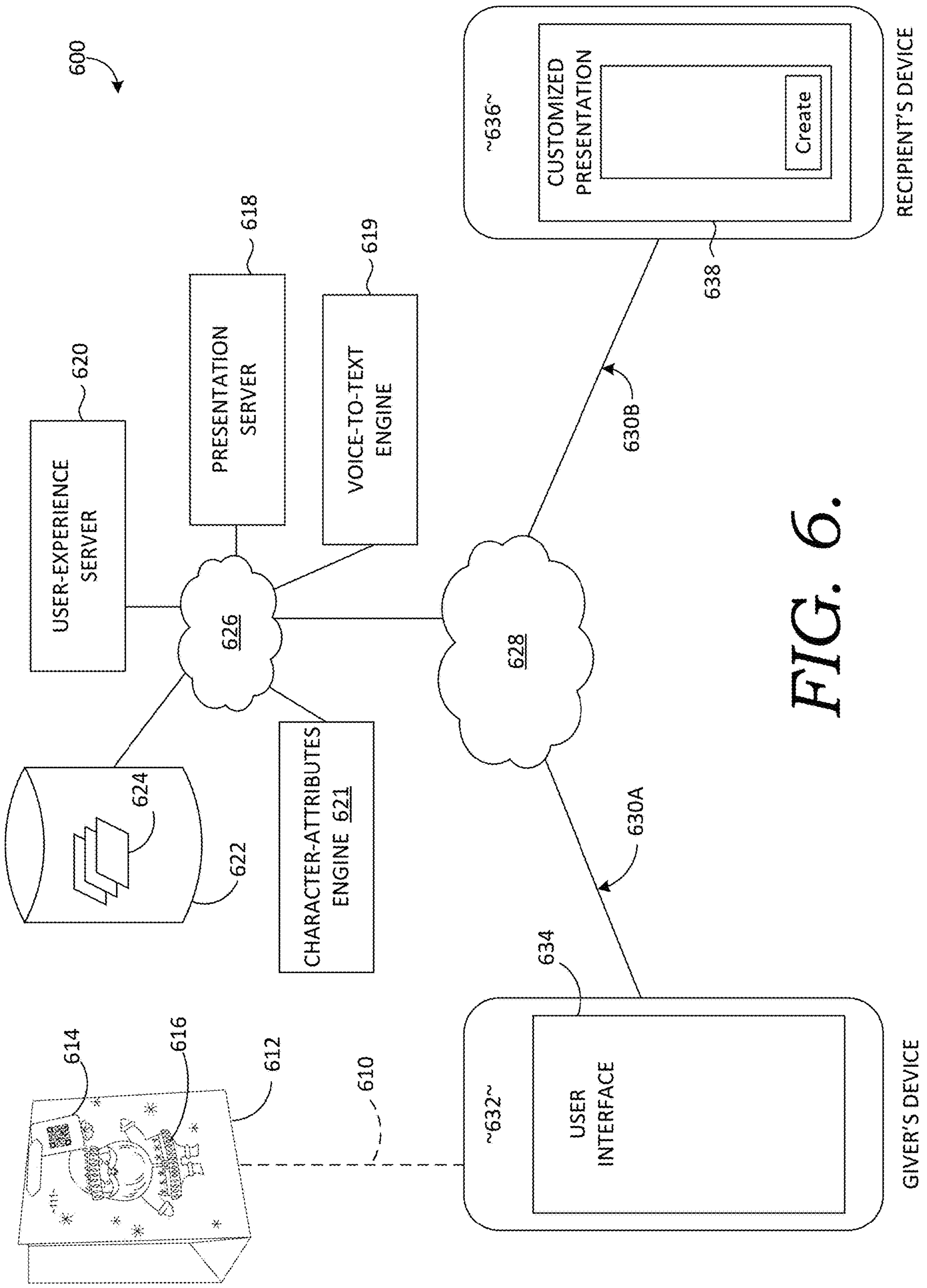
FIG. 6 depicts an illustrative operating environment suitable for practicing aspects of the disclosed technology.
Figure 7:
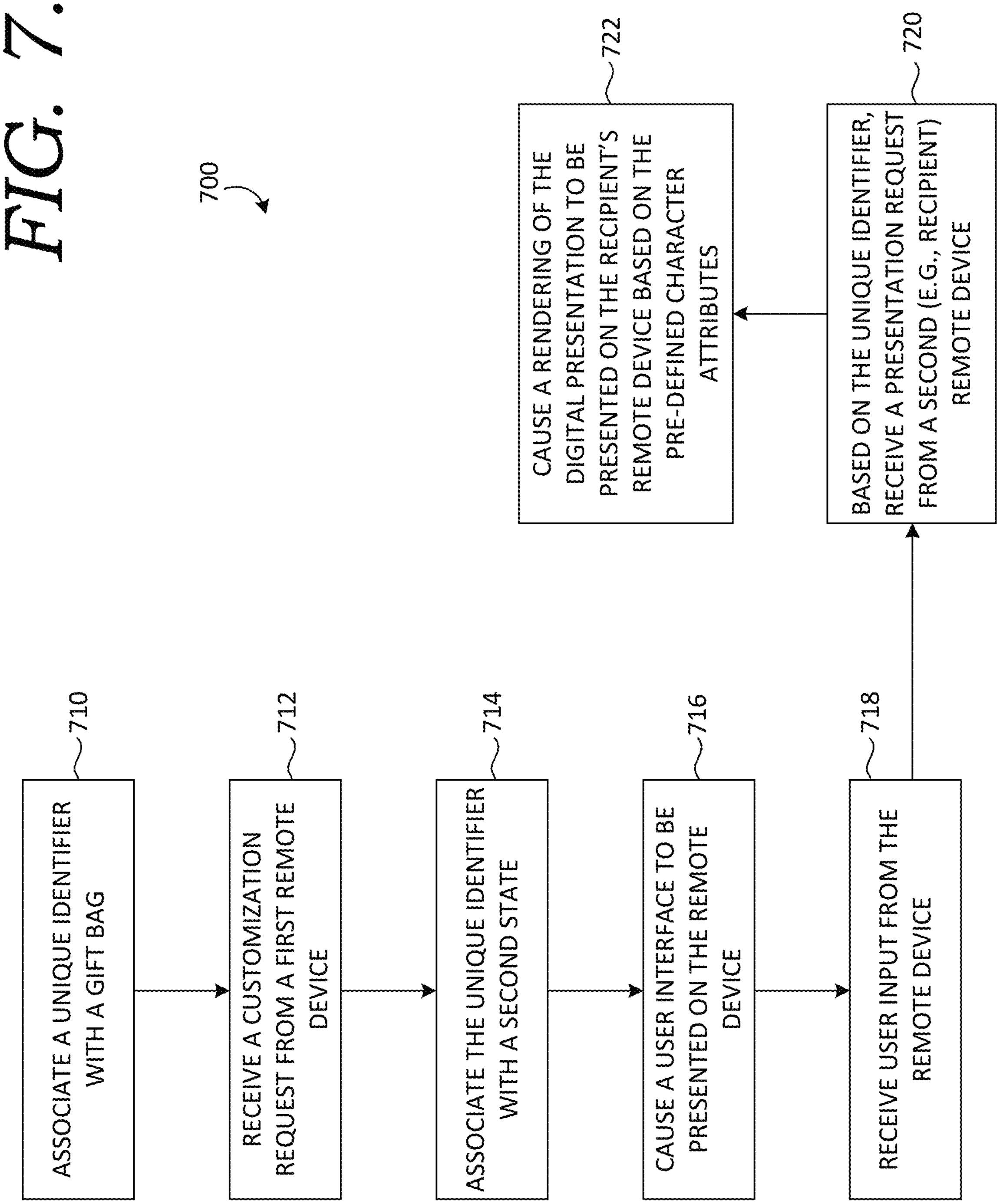
FIG. 7 is a flow diagram that depicts select steps carried out or implicated by one embodiment of the disclosed technology.

FIG. 6 depicts an illustrative operating environment suitable for practicing an embodiment of the disclosed technology. It will be described in conjunction with FIG. 7, which depicts an illustrative method of practicing an embodiment of the invention. At a step 710, a unique identifier is associated with a gift bag. For example, unique identifier 614 is associated with gift bag 612. In one embodiment, this occurs by generating unique identifier 614. The identifier 614 can be stored in a database 622 as part of one or more records 624. In one embodiment, a record in database 622 stores information in connection with unique identifier 614, such as state information. In some embodiments, unique identifier 614 and gift bag 612 are regarded as the same two components of system 600.

Gift bag 612 might have several states. For example, before gift bag 612 is sold, unique identifier 614 might have an "unsold" (or similar) status. After the bag is purchased, the record associated with gift bag 612 might indicate a "sold" or "active" or "ready" state. After a gift giver begins creating a presentation, the status of unique identifier 614 might be "in process" or "working." And after an indication is received that the presentation is complete, gift bag 612's status might be "download," "present" or similar.

Thus, depending on the status associated with unique identifier 614, different responses will occur incident to unique identifier 614 being scanned. This can be done to prevent shoppers from being allowed to create a presentation before the bag is purchased. In other embodiments, unique identifier 614 can be obscured prior to purchase if the gift bag is desired to be ready to go in an active state when shipped from a supplier. But the majority of the illustrative examples herein contemplate a scenario where unique identifier 614 takes on different statuses based on the occurrence of various events, such as purchase, presentation creation, and playback requests.

Still further, the state identifiers can be used to facilitate additional functionality. An illustrative additional functional aspect that could be afforded by tracking status identifiers includes providing a countdown feature whereby a recipient receives a varied presentation as time counts down to an event. For example, if a gift giver provides a present during the Christmas or Diwali season, the recipient could scan the unique identifier each day and receive a different digital presentation each day. As the days advance, the status identifier could transition to indicate that a new presentation should be presented. The gift giver, having established a login or other credentials when initially configuring the first presentation, will maintain an ability to create new presentations even in the physical absence of the unique identifier. These aspects increases anticipation of unveiling the gift and further enhances the relationship between the giver and recipient and the overall gifting experience.

Broken line 610 indicates that a first device, such as a giver's computing device 632, can be used to interact with gift bag 612 by scanning unique identifier 614. At a step 712, a customization request is received from a first remote device, such as device 632. For example, a user could use device 632 to invoke an app that is usable to scan unique identifier 614 (in the case of it being a QR code or similar).

Doing so would invoke a request to customize a presentation that would ultimately be presented on a recipient's device 636.

The request could be received through one or more networks, such as a telecommunications or other broad network 628 (via links 630A or 630B for example) and a more localized network 626. Network 626 (alone or in combination with network 628) facilitates communications between database 622, a user-experience 620, a presentation server 618, a voice-to-text engine 619, and a character-attributes engine 621. Other components, servers, etcetera could be used to facilitate aspects of the disclosed technology. In some embodiments, no distinction is made between networks 628 and 626—they may be regarded as single network, portions of a larger common network, or connected to the Internet.

User-experience server 620 includes one or more processors that help facilitate an information exchange between other computing components. In some embodiments, various servers and engines are different devices (logically or physically). In other embodiments, the servers or engines are all part of one device or one overall server. A single computing device can include multiple servers. User-experience server 620 receives the request from the gift giver's device 632 in one embodiment. It references database 622 and identifies a record in a data file among a set of data files represented by numeral 624 (one record or many).

The record associated with unique identifier 614 includes information about gift bag 612 in one embodiment. The record, illustratively referred to by numeral 624, also includes state information in one embodiment. The state information is usable to identify various states that unique identifier 614 can take on. Examples of these have been mentioned previously. They are, for example, are usable to distinguish a gift bag that has not been sold, from one that has been sold, or otherwise indicate statuses such as whether a customization presentation has been begun, finalized, presented, etc.

Data files (or records) in database 622 are usable to store a variety of information and metrics, such as who has downloaded presentations, where they were watched, how often they were viewed, etcetera. This information can be stored for historical purposes and used later to further enhance the system.

Presentation server 618 helps facilitate the creation and delivery of a custom presentation that is customized by a user via remote device 632 or observed via second device 636, which would be a recipient's device. In some embodiments, device 632 and 636 could be the same device. First device 632, as well as second device 636, could take on a variety of forms. In one embodiment, the giver's device is a smartphone. In other embodiments, it is a PC, workstation, server, or other computing device. In one embodiment, presentation server 618 helps present a user interface 634 on the giver's device 632.

Although not shown, user interface 634 includes a variety of controls that are usable to create a customized presentation. Illustrative controls include UI components such as buttons, sliders, and other controls that expose desired functional aspects, such as entering text in a text box, recording voice, indicating links to be used, etcetera.

In some embodiments, presentation server 618 receives the input from first device 632 and includes functionality to present a customized presentation 638 on target device 636. In one embodiment, presentation server 618 cooperates with character-attributes engine 621 to facilitate delivery of presentation 638 in a manner consistent with one or more thematic characters presented on or in connection with gift bag 612, such as Santa Claus 616. That is a key aspect of the disclosed technology: tailoring presentation 638 to be presented in a manner based on attributes of one or more thematic characters that appear on the gift bag.

Character-attributes engine 621 can be used to store attributes of thematic characters. For example, it can be used to store attributes of a dog, a cat, a horse, cultural icons, superheroes, or even attributes personal to the gift giver or recipient. For example, the gift giver can upload a sample of his or her voice, which can then be used to create voice-to-text audio from inputted text. Character-attributes engine 621 can include a variety of attributes, such as tone of voice, inflection points, mannerisms, etcetera. Again, as mentioned, each server or engine might not be distinguished as servers. They could all be part of a common program or related programs.

Voice-to-text engine 619 is usable to generate an audio output from textual input. In this way, a user might type a desired textual message to be delivered to recipient device 636. In that case, instead of the text only being visually presented on recipient device 636, it is read aloud and presented via a speaker of device 636.

Returning to FIG. 7, at a step 714, unique identifier 614 is associated with a second state after having received a customization request via remote device 632. This is usable to indicate that a user has begun creating a customized presentation. The second state could indicate, for example, an "in progress" state. In other embodiments, the second state could indicate any other desired state that an implementor desires to indicate.

At a step 716, user interface 634 is caused to be presented on remote device 632. The user interface could be controlled by an internal or a third-party server. User interface 634 facilitates receiving input from a user that indicates desired outputs to ultimately be rendered on recipient device 636. This is indicated by numeral 718, wherein user input is received from remote device 632. The user input could include a variety of types of input, such as timing as to when the customized presentation 638 is viewable, geolocation aspects such that the presentation 638 takes on a different format and/or includes different content based on a physical location of recipient device 636 when presentation 638 is being viewed, and more.

At a step 720, based on the first unique identifier 614, a presentation request is received from second remote device 636. In one embodiment of the disclosed technology, after a giver's device 632 has been used to create a customized presentation, it is ready to be presented on target device 636. As previously mentioned, the presentation could exist in a completed and stored state, stored in a database such as database 622. In other embodiments, database 622, presentation server 618, or other component stores data or metadata that is usable to render aspects of customized presentation 638 in real time (e.g., on demand).

When a recipient receives gift bag 612, the recipient can scan unique identifier 614 using a computing device, such as smartphone 636. Scanning unique identifier 614 initiates a request to receive customized presentation 638. And in this way, the request received is based on unique identifier 614.

Incident to receiving the request from recipient 636, user-experience server 620 (or other component), causes the rendering of presentation 638 on second remote device 636 based on the pre-defined character attributes stored in the database 622. In this way, a gift recipient receives an enhanced gifting experience that is enhanced with multimedia presented by way of smartphone 636 for example.

Without the disclosed technology a user would have only received gift bag 612 and its contents. But by using the disclosed technology, the gift experience is enhanced by a complementary digital presentation that is customized by a gift giver, deepening the gift-receiving experience. The technology allows a gift recipient to feel more special. It allows the gift giver to express more intentionality, especially in situations where gift givers are not able to be present when their gift is received by a recipient.

Many different arrangements of the various components depicted, as well as components not shown, are possible without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub combinations are of utility, may be employed without reference to other features and sub combinations, and are contemplated within the scope of the claims.

What is claimed is:

1. One or more non-transitory computer-storage media comprising instructions recorded thereon that, when executed by at least one processor of a system, cause the system to perform a set of steps, the steps comprising:

associating a first unique identifier with a first gift bag, wherein the first unique identifier is associated with a first state;

receiving a customization request from a first remote device that indicates a desire to customize a first digital presentation that will be associated with the first unique identifier;

incident to receiving the customization request, associating the first unique identifier with a second state;

causing a user interface to be presented on the remote device, wherein the user interface is configured to facilitate presenting one or more controls that are useable to facilitate a creation of the digital presentation that includes a thematic character associated with a set of pre-defined character attributes;

receiving user input from the remote device, wherein the user input indicates desired content to be included in the digital presentation;

based on the first unique identifier, receiving a presentation request from a second remote device, wherein the presentation request is useable to determine a rendering of the digital presentation to present; and causing the rendering of the digital presentation to be presented on the second remote device, wherein the rendering is presented based on the pre-defined character attributes.

2. The computer-storage media of claim 1, wherein the first unique identifier is one or more of the following:

a QR code;

a bar code;

a string of alphanumeric digits; or a unique hyperlink.

3. The computer-storage media of claim 1, wherein the first state indicates that the first gift bag is not associated with the first digital presentation.

4. The computer-storage media of claim 3, wherein the customization request is initiated in response to a digital interaction with the first unique identifier, wherein the digital interaction includes one or more of the following:

receiving an indication that the QR code or bar code has been scanned;

receiving an indication that the hyperlink has been activated; or receiving an indication that the string of alphanumeric digits has been provided.

5. The computer-storage media of claim 1, wherein the remote device includes:

a mobile phone;

a personal computer;

a workstation;

a tablet; or a server.

6. The computer-storage media of claim 1, wherein the second state indicates that the first digital presentation has begun being created.

7. The computer-storage media of claim 1, wherein the creation of the digital presentation results in one or more of the following:

the digital presentation is completed and stored for later retrieval; or data to present at least portions of the presentation in real time or on demand are stored.

8. The computer-storage media of claim 1, wherein the predefined character attributes include one or more of:

a vocal tone pattern;

a vocal inflection pattern;

wording associated with the thematic character;

a set of visual attributes that define a look and feel of the thematic character; and a set of movement patterns.

9. The computer-storage media of claim 1, wherein the desired content includes a text message, a video segment, an audio message, a music piece, a song, a movie, or combinations of the same.

10. The computer-storage media of claim 1, wherein the presentation request being based on the first unique identifier includes the presentation request indicating the first unique identifier.

11. A gifting system, comprising:

a container having an outer shell adapted to receive a gift item in a void defined by the shell;

a thematic character depicted on at least a portion of the outer shell; and a unique identifier coupled to the container, wherein the unique identifier uniquely identifies the container and is useable to reference a first digital record stored in a computing system, the computing system comprising:

a registration database that associates the unique identifier with the gift container, wherein the unique identifier is associated with a first state, one or more processors coupled to the registration database for updating the first state to a second state upon receiving an indication that the unique identifier has become associated with a digital presentation; and a presentation server coupled to the registration database and the one or more processors, wherein the presentation server is adapted to (1) receive user input from a remote device and (2) upon request, present a custom presentation on the remote device that includes the user input presented in a context that includes predefined attributes associated with the thematic character.

12. The gifting system of claim 11, wherein the container includes one or more of a gift bag or a gift box.

13. One or more non-transitory computer-storage media comprising instructions recorded thereon that, when executed by at least one processor of a system, cause the system to perform a set of steps, the steps comprising:

associating a first unique identifier with a first gift bag in a first database, wherein the first unique identifier is associated with a first state;

receiving an association indication that the first unique identifier has become associated with a digital presentation;

incident to receiving the association indication, updating the first state of the first unique identifier to a second state; and incident to receiving a playback request associated with the first unique identifier, facilitating a presentation of the digital presentation on a remote device.

14. The computer-storage media of claim 13, further comprising varying said digital presentation over time such that different digital presentations are provided incident to receiving subsequent requests to receive a version of a subsequent digital presentation.

* * * * *